United States Patent [19]

Luedtke et al.

[11] 4,025,924
[45] May 24, 1977

[54] MOBILE DIRECTION COMPARATOR

[75] Inventors: Arthur Luedtke, Marietta; William Ferrel Bentley, Jr., Smyrna, both of Ga.

[73] Assignee: The United States of America as represented by the Field Operations Bureau of the Federal Communications Commission, Washington, D.C.

[22] Filed: Sept. 10, 1975

[21] Appl. No.: 611,954

[52] U.S. Cl. .......................... 343/121; 343/113 PT
[51] Int. Cl.² .......................................... G01S 5/04
[58] Field of Search .......... 343/121, 112 R, 113 PT

[56] References Cited

UNITED STATES PATENTS

| | | | |
|---|---|---|---|
| 2,997,710 | 8/1961 | Contuno | 343/121 |
| 3,453,627 | 7/1969 | Lode | 343/121 |
| 3,916,411 | 10/1975 | Fiedler | 343/121 |

*Primary Examiner*—Maynard R. Wilbur
*Assistant Examiner*—T. M. Blum
*Attorney, Agent, or Firm*—Wm. Ferrel Bentley

[57] ABSTRACT

A Mobile Directional Comparator (MDC) used in combination with a communications receiver to process received signal information from a two port antenna system to drive a directional indicator. A radio frequency modulator modulates two received cardioid antenna signal patterns with two low frequency sine wave signals at a low modulation percentage and out of phase with each other. The two modulated cardioids are then combined in a hybrid circuit to produce a non-directional radio frequency signal pattern with respect to the antennae center axis. The combined modulated rf signal is carried through the receiver as a normal signal, and the intermediate frequency output of the receiver is processed by a phase demodulator in the MDC to extract from the signal phase and amplitude information to drive the directional indicator.

11 Claims, 3 Drawing Figures

MOBILE DIRECTION COMPARATOR

BACKGROUND OF THE INVENTION

1. Field of the Invention

The present invention relates to improvements in direction finding systems, and more particularly pertains to a Mobile Directional Comparator for use with a communications receiver and two port antenna system to process signal patterns to obtain directional information. The two received radio frequency signals from an unknown rf signal source are modulated with two low frequency sine waves combined together in a hybrid circuit, carried through the receiver as a normal rf signal, and the intermediate frequency output of the receiver is processed to extract the phase and amplitude information to drive a directional indicator.

2. Description of the Prior Art

In the field of direction finding receiving systems, it has been a general practice to employ a square wave antenna modulation system to carry directional information through the receiver whereupon the IF output of the receiver is processed to extract directional information for the purpose of driving a directional indicator. Such devices have been unsatisfactory in that there is disturbance to the information on the received signal such as hash, hum, etc. Depending upon the modulation percentage of the square wave, the information on the received signal is unintelligible. As a result, it is difficult to simultaneously monitor the signal, record the signal, and direction find the signal radiating from the unknown rf signal source. Square wave modulation due to its hum, hash, etc. makes the information on the signal unintelligible, and although it is possible to direction find the received signal from the unknown rf signal source, it is not possible to simultaneously recover the information contained on the signal carrier. Further, some modulation systems require special antennae that can only be used over a very limited frequency range. The antenna might not lend itself readily from one direction finding application to another as the frequency of the unknown rf signal source might be different. Also, some modulation systems are unique to one particular communications receiver. It is therefore impossible to change communications receivers readily to cover different portions of the frequency spectrum. If it is necessary to cover a different portion of the frequency spectrum, it is necessary to not only use a different communications receiver, but also use a different modulation system which make rapid frequency changes impossible.

In a U.S. Pat. issued to Cotuno, 2,997,710, a direction finding system utilizes a square wave lobe switch to switch the termination and field patterns of each end of a rhombic antenna thereby modulating the incoming signal with a square wave of predetermined frequency. The signal that is modulated is fed to a receiver which filters the radio frequency carrier from a composite signal, and the remaining square wave signal is fed to an amplifier which functions to rotate the antenna in a direction such that the unknown rf signal received in each of the two cardioid field patterns has the same amplitude. Through a feedback loop, the rhombic antenna is rotated until the two cardioid field patterns have the same strength resulting in the direction of signal reception.

SUMMARY OF THE INVENTION

The general purpose of this invention is to provide a Mobile Directional Comparator that has all the advantages of similarly employed radio frequency modulated direction finding receiving systems, and has none of the above described disadvantages. To attain this, the present invention provides sine wave radio frequency modulation of the received unknown rf signal source for the communications receiver. An object of the present invention is the provision of modulating a received signal from an unknown rf signal source with a low frequency sine wave from the mobile directional comparator. Another object is to provide for the use of any communications receiver with the mobile directional comparator and also allowing for simultaneous monitoring, recording, and direction finding. A further object of the invention is the provision that the mobile directional comparator can be used directly with integral delay line antennas such as the Towel Rack, Defroster, or other directional pair two port antennae systems. Some directional pairs such as spaced whips will require delay lines designed to match the antenna spacing. Still another object is to provide a mobile direction comparator with a radio frequency modulator that modulates each of the two antenna cardioid patterns with a 46 hertz low frequency sine wave with the 46 Hz low frequency pattern with each sine wave being 180 degrees out of phase and having a modulation percentage of twenty percent. A still further object is to combine the two modulated cardioids in a hybrid circuit to produce a non-directional rf pattern with respect to the center axis of the antennas. Therefore, the 46 Hz audio modulation reaches to zero at points of cardioid equality and reaches maximum when the cardioids are most unequal. An additional object of the invention is that the combined rf signal is carried through the communications receiver as a normal signal, and the intermediate frequency output of the receiver is processed to extract the phase and amplitude directional information for the purpose of driving a directional indicator. A further additional object is the utilization of integrated circuits.

BRIEF DESCRIPTION OF THE DRAWINGS

Other objects and features of the invention will become apparent to those skilled in the art as the disclosure is made in the following description of a preferred embodiment of the invention, as illustrated in the accompanying drawings, in which FIGS. 1A and 1B is the circuit diagram where two sheets of drawings are aligned at the respective letters;

DETAILED DESCRIPTION OF THE INVENTION

Figure 1A:
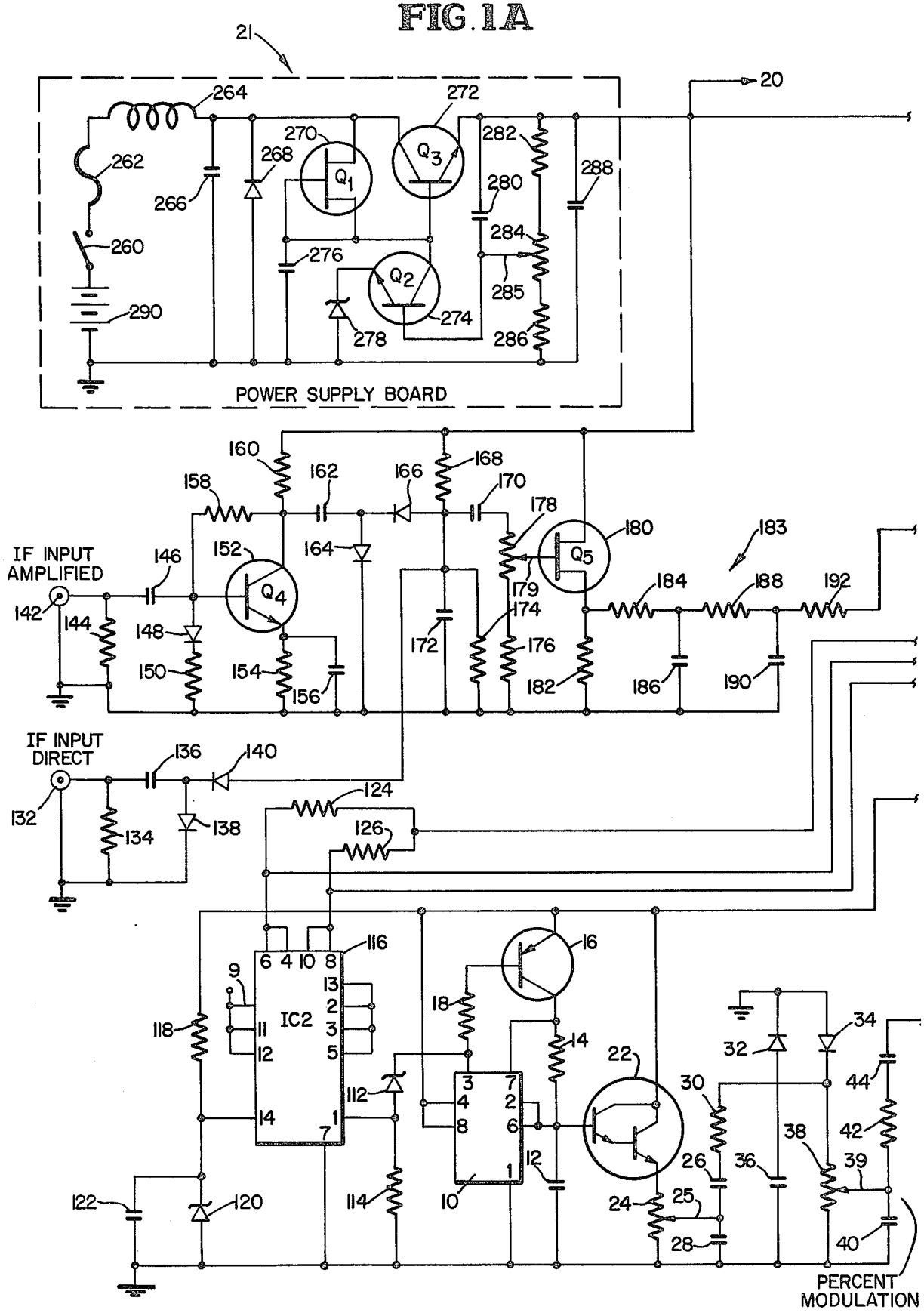
FIGS. 1A and 1B are a circuit diagram of the invention.
Figure 1B:
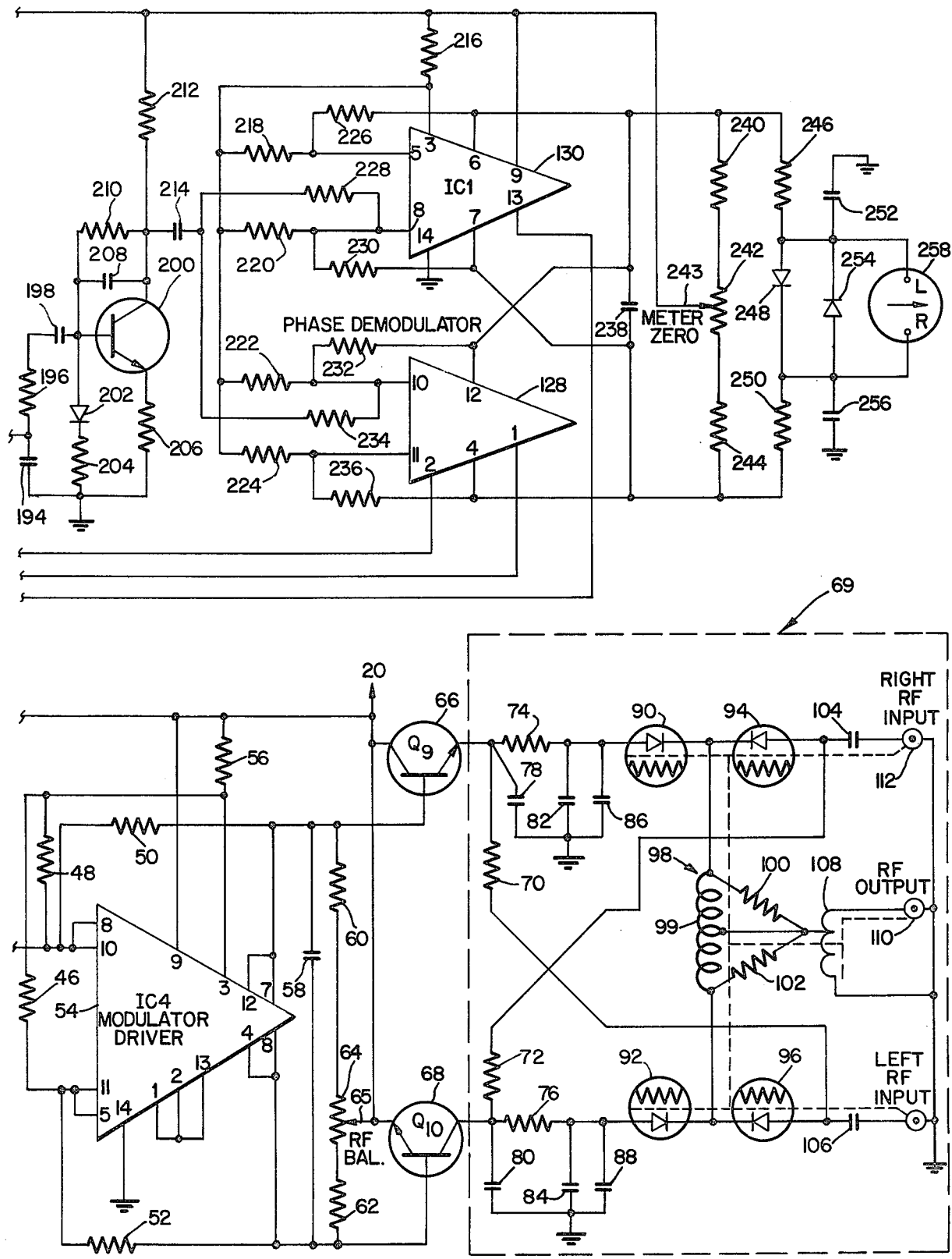

The circuit diagram of FIG. 1 illustrates the mobile directional comparator 9. Timing oscillator 10, a Signetics NE-555V, is utilized to produce a low frequency signal of forty six hertz required for the radio frequency modulator and the intermediate frequency demodulator circuitry. Pin 1 of timing oscillator 10 is connected to ground. The time constant of timing oscillator 10 is set by the charge rate of capacitor 12 connected from pins 2 and 6 of timing oscillator 10 to ground. Timing oscillator 10 provides square waveform and triangular waveform outputs ninety degrees out of phase. The charge-discharge rate of timing capacitor 12 is determined by series resistor 14. Resistor 14 is connected from pins 2 and 6 to pin 7 of timing oscillator 10. PNP switching transistor 16 included to ensure equal on-off time has its base driven off of the square wave output, pin 3 of timing oscillator 10 through limiting resistor 18. The emitter of transistor 16 is connected to pin 7 of timing oscillator 10. Pin 7 of timing oscillator 10 is the discharge for timing capacitor 12 through series resistor 14 on the first half cycle when transistor 16 is turned off. When transistor 16 turns on during the next half cycle, timing capacitor 12 is charged through resistor 14. This cycling action causes equal on-off time. Pins 4 and 8 of timing oscillator 10 and the collector of transistor 16 are connected to the power supply output 20.

A triangular waveform appearing across timing capacitor 12, pins 2 and 6 of timing oscillator 10 are coupled to wave shaping circuitry through the base of a Darlington connected transistor 22. The collector of Darlington connected transistor 22 is connected to power supply output 20. Darlington connected transistor 22 is used as a high impedance voltage follower coupling stage to take the triangular waveform from timing oscillator 10 to the wave shaping circuitry without changing its shape. Potentiometer 24 is connected from the emitter of Darlington connected transistor 22 to ground so as to load the emitter of Darlington connected transistor 22. Wiper arm 25 of potentiometer 24 is used for adjusting the signal and clipping level of the triangular waveform. Bypass capacitor 28 is connected from the wiper arm 25 of potentiometer 24 to ground to remove higher order harmonics from the triangular waveform. A direct current blocking capacitor 26 is connected from wiper arm 25 of potentiometer 24 to resistor 30 which is used as a series dropping resistor to set the clipping level of diodes 32 and 34. Parellel reverse diodes 32 and 34, forming the wave shaping circuitry, are connected from resistor 30 to ground to clip the triangular waveform. By clipping the peaks of the triangular waveform and filtering the clipped waveform, a sine wave is formed from the triangular waveform. The triangular waveform has third and higher order harmonic components until the peaks have been clipped thereby leaving fifth and higher order harmonics of the triangular waveform. The higher order harmonics can be removed with very little filtering. Bypass capacitor 36 is connected from resistor 30 to ground to remove the higher order harmonics of the triangular waveform. Since diodes 32 and 34 forming the wave shaping circuitry have only minor delay elements involved, there is minimum phase shift in the clipped waveform.

Potentiometer 38 is connected from parallel reverse diodes 32 and 34, resistor 30, and bypass capacitor 36 to ground and adjusts the signal level at modulator driver 54 thereby controlling the modulation percentage at radio frequency modulator section 69. Bypass capacitor 40 is connected from the wiper arm to ground to filter out higher order harmonics of the sine wave. Gain limiting resistor 42 is connected from wiper arm 39 of potentiometer 38 to a direct current blocking capacitor 44 which is then connected to pin 10 of modulator driver 54, a RCA CA3050. Modulator driver 54 is a dual differential Darlington used as a driver with both amplifiers paralleled. Pin 8 is connected to pin 10 of modulator driver 54. Modulator driver 54 provides dc bias rf modulator diodes in rf section 69 and also inverts the low frequency sine wave signal so that the two outputs of modulator driver 54 and 180° out of phase. Pin 9 is connected to power supply 20 while pin 14 is connected to ground. Pins 1, 2 and 13 are connected together. Bias setting resistor 56 is connected from power supply 20 to pin 3. Feedback resistor 50 on pin 10 and feedback resistor 52 on pin 11 are connected to pins 7 and 6 respectively of modulator driver 54. Pin 5 is connected to pin 11. Resistor 46 and 48 are bias resistors connected from pin 3 to pin 10 and pin 11 respectively of modulator driver 54. Output load resistors 60 and 62 are connected from pins 7 and 8 respectively with balance potentiometer 64 connected between output load resistors 60 and 62. Pin 12 is connected to pin 7 and pin 4 is connected to pin of modulator driver 54. High frequency roll off capacitor 58 is connected from pin 7 to pin 6 to prohibit modulator driver 54 from oscillating. Wiper arm 65 of potentiometer 64 is connected to power supply 20. Collectors of emitter follower transistors 66 and 68 are connected to pins 7 and 6 of modulator driver 54 respectively. Emitter follower transistors 66 and 68 are used as buffers for the outputs of modulator driver 54 to the rf modulator section 69 to keep the rf modulator section isolated from the modulator driver 54 and to provide circuit protection between the modulator driver 54 and the rf modulator section 69.

The rf modulator section 69 uses matched pairs of Hewlett Packard PIN diodes, current controlled rf resistors, in a L configuration to give a constant input impedance and to modulate the signals out of phase by 180°. The PIN diodes are supplied with dc bias and low frequency sine wave signals from modulator driver 54 thereby modulating the incoming rf signals with about 20 per cent modulation. The resultant rf signals from the matched pairs of PIN diodes are combined in a hybrid circuit 98 which is designed to sum the rf signals with at least 25 dB of isolation between two antenna ports 110 and 111. The combined rf output 110 of the rf modulator 69 is used to feed the rf input of a communications receiver. Diodes 90 and 92 are the shunt diodes while diodes 94 and 96 are the series diodes. When one shunt diode is modulated down, the corresponding series diode is modulated up, effectively maintaining a 50 ohm imput impedance and modulating an incoming rf signal at the same time. The rf modulator 69 has two rf antenna input ports; one for a right antenna connection, 112, and the other for a left antenna connection, 111. From right rf antenna input port 112 is a series blocking capacitor 104 connected to the anode of series PIN diode 94. The cathode of shunt PIN diode 90 is connected to the anode of series PIN diode 94. Series dropping resistor 74 is connected from emitter of transistor 66 to the anode of shunt PIN diode 90. Bypass capacitor 78 is connected from the anode of shunt PIN diode 90 to ground for rf grounding of the shunt diode. From emitter of transistor 68 to the anode of series PIN diode 94 is connected series dropping resistor 72 to set the current to the diode 94. From the left rf antenna input port 111 is series blocking capacitor 116 connected to the anode of series PIN diode 96.

The cathode of shunt PIN diode 92 is connected to the anode of series PIN diode 96. Series dropping resistor 76 is connected from emitter of transistor 68 to the anode of shunt PIN diode 92. Bypass capacitor 80 is connected from emitter of transistor 68 to ground to keep stray rf out of the rf modulator, Bypass capacitors 84 and 88 are connected from the anode of shunt PIN diode 92 to ground for rf grounding of the shunt diode. From emitter of transistor 66 to the anode of series PIn diode 96 is connected a series dropping resistor 70 to set the current to the diode 96.

A hybrid combiner 98 consisting of a coil 99 and two loading resistors 100 and 102 in a delta network has a coil 99 connected from the common connection point of PIN diodes 90 and 94 to the common connection point of PIN diodes 92 and 96. Hybrid combiner 98 combines the two rf modulated signals and which keeps the two signals isolated from each other. Loading resistors 100 and 102 having a common connection are wired to each side of coil 99 of hybrid combiner 98 to form a delta network. The common point of the delta network of loading resistors 100 and 102 is the connection for a 2 to 1 impedance ratio matching transformer 108. Since each rf antenna input port is 50 ohms, hybrid combiner 98 has an output impedance of 25 ohms which impedance matching transformer 108 converts to a 50 ohm impedance which is the rf output port 110 that is connected to a communications receiver antenna input.

The phase demodulator driver 116 is an open collector hex inverter MC 7405P. Hex inverter 116 is driven by a square wave from timing oscillator 10. The square wave output from pin 3 of timing oscillator 10 is fed through a Zener level shifter 112 to pin 1 of hex inverter 116. The Zener level shifter 112 is used so that hex inverter 116 will not burn up on account of overvoltage to its input. Load resistor 114 is connected from pin 1 to ground so that pin 1 will have a zero reference voltage. Pin 7 is connected to ground. Between pin 14 of hex inverter 116 and power supply output 20 is series power supply dropping resistor 118. A zener diode 120 and bypass capacitor 122 are connected from pin 14 of the hex inverter 116 to ground. Zener diode 120 provides a constant dc source while bypass capacitor keeps the noise from the zener diode 120 at a minimum. Pins 9, 11, and 12 are connected together as are pins 2, 3, 5, and 13 of hex inverter 116. The output of pin 12 is put into two more hex inverters at pins 9 and 11 so that there are two output signals exactly equal and opposite on pin 6 and pin 8 of hex inverter 116. Biasing voltages are derived from pin 2 of phase demodulator 128. From pin 2 of phase demodulator 128 are connected resistors 124 and 126 going to pins 6 and 8 respectively of hex inverter 116 and 1 and 13 of phase demodulators. The resistor 124 and 126 provide bias voltage for the phase demodulators 128 and 130 respectively which is chopped by the hex inverter thereby turning each phase demodulator alternately off and on for a half cycle.

There are two intermediate frequency inputs; an IF input direct 132 and an IF input amplified 142. These sections takes the IF output of the receiver and process it for recovery of the low frequency component. IF input direct 132 has a loading resistor 134 connected to ground and a dc blocking capacitor 136. A voltage double rectifier utilizing diode 138 having the anode connected to dc blocking capacitor 136 and the cathode to ground, and diode 140 having the cathode connected to dc blocking capacitor 136 and the anode connected to the cathode of diode 164. IF direct input 132 is for high level signals and requires a minimum 0.5 volt peak-to-peak IF signal to yield full meter deflection. IF direct input 132 will accommodate up to a 10 volt peak-to-peak signal before clipping occurs by adjusting the gain control potentiometer 178. IF input amplified 142 has a terminating resistor 144 connected to ground so that the input will be 50 ohms and a dc blocking capacitor 146 connecting to the base of transistor 152 which operates in a grounded emitter configuration. Connected between the emitter of transistor 152 and ground is emitter bias resistor 154 and emitter bypass capacitor 156. Feedback resistor 158 is connected from the collector to the base of transistor 152. Diode 148 has its anode connected to the base of transistor 152 and its cathode connected to resistor 150 which is connected to ground. Diode 148 is provided for temperature compensation and stability in the feedback circuit, and resistor 150 is provided for loading. Collector resistor 160 is connected from the collector of transistor 152 to power supply 20. A dc blocking capacitor 162 is connected from the collector of transistor 152 to the cathode of diode 162. The anode of diode 164 is connected to the cathode of diode 166 and its cathode is connected to ground. Diodes 164 and 166 comprise a voltage doubler connected to the same common node as the IF input direct 132. IF input amplified 142 requires a minimum 50 millivolt peak-to-peak IF signal to yield full meter deflection. IF amplified input will accommodate up to a 500 millivolt signal before the transistor amplifier 152 starts clipping. Bias resistor 168 is connected from power supply 20 to the common diode node to bias both sets of the diodes in the conduction state so that the diodes can rectify lower voltage signals. From the anode of diode 166 is connected a filter capacitor 172 to ground and a load resistor 174 to ground. Also from the anode of diode 166 is a dc blocking capacitor 170 connected to gain control potentiometer 178. Resistor 176 is connected from the IF gain control potentiometer 178 to ground to adjust the directional indicator meter 258 for full scale deflection for communication receivers with different IF output levels. Wiper arm 179 of the IF gain control potentiometer 178 is connected to the gate of transistor 180 used as an impedance matching network to a low impendance, three stage, low pass filter. Load resistor 182 from the drain of transistor 180 is connected to ground and the source of transistor 180 is connected to power supply 20. From the drain of transistor 180 is a low impedance, three stage, low pass filter 183 comprising resistors 184, 188, and 192, connected in series and capacitors 186, 190, and 194 connected from the output of filter 183 to a dc blocking and low pass filter capacitor 198 which is connected to the base of audio gain transistor 200. Transistor 200 is used as an active band pass filter for gain and matching purposes. Emitter resistor 206 is connected from the emitter of transistor 200 to ground, and collector resistor 212 is connected from the collector of transistor 200 to power supply 20. Capacitor 208 is used for high frequency rolloff and is connected from the base to collector of transistor 200 as is feedback resistor 210. Capacitor 208 is effectively part of the filter. The anode of diode 202 is connected to the base of transistor 200 which is then followed by resistor 204 connected to ground that is used as bias circuitry. Diode 202 compensates for temperature stability. A dc isolating coupling capacitor 214 is connected from the collector of transistor 200 to resistors 228 and 234 which are connected to pins of 8 and 10 of phase demodulator 130 and 128 respectively. The total phase shift through the filter system is 180 degrees so that the recovered sine wave signal is in phase with the square wave output of the timing oscillator as required for demodulation purposes.

The phase demodulator, 128 and 130, is a RCA CA 3050 dual differential Darlington cross connected to extract phase and amplitude information. Square wave bias switching is provided to pins 1 and 13 of phase demodulators 128 and 130 respectively from the hex inverter 116 resulting in full wave phase demodulation of the low frequency sine wave input signal. Biasing resistor 216 is connected from power supply 20 to pin 3 of phase demodulator 130 to bias the two stages equally. The current through biasing resistor 216 is determined by diodes inside phase demodulator 130. The voltage level from pin 3 is fed through resistors 218, 220, 222, and 224 to four inputs comprising pins 5, 8, 10, and 11 of phase demodulators 128 and 130. The input to the phase demodulators 128 and 130 is through series limiting resistors 228 and 234 connected between dc coupling capacitor 214 and to pins 10 and 3 respectively. The feedback resistors for phase demodulator 130 are resistor 226 from pin 5 to 6 and resistor 230 from pin 7 to 8. The feedback resistors for phase demodulator 128 are resistor 232 from pin 10 to 12 and resistor 236 from pin 4 to 11. Pin 14 of phase demodulator 130 is connected to ground. A high frequency rolloff capacitor 238 is connected from pin 6 of phase demodulator 130 and pin 12 of phase demodulator 128 to pin 7 of phase demodulator 130 and pin 4 of phase demodulator 128. From pin 6 of phase demodulator 130 is connected in series of collector resistor 240, a balance potentiometer 242, and a collector resistor 244 which is connected to pin 4 of phase demodulator 128. Also from pin 6 of phase demodulator 130 in series is a filter resistor 246 to the anode of diode 248 to which filter resistor 250 is connected to the cathode of diode 248 and pin 4 of phase demodulator 128.

Across diode 248 is connected a parallel reverse diode 254. From the junctions of the parallel reverse diodes 248 and 254 to ground are capacitors 252 and 256 forming low pass filters with resistors 246 and 250 for filtering and smoothing purposed. Potentiometer 242 has wiper arm 243 connected to power supply 20 and is used for zeroing (centering) meter 258 connected across parallel reverse diodes 248 and 254. The parallel reverse diodes 248 and 254 are used to eliminate the overdriving of the meter as the breakdown of the diodes occurs just below 100 per cent deflection. The diodes 248 and 254 also provide non linear meter movement by reducing the deflection by about 10 percent.

The power supply section 21 is a pass type feedback voltage regulator adjustable over the range of 9 to 13 volts. Field effect transistor 270 is used as a constant current source which improves voltage regulation and limits the maximum current if when the supply were to be short circuited. The dc power supply 290 is a dc source such as an automobile battery. A switch 260 is connected to dc power supply 290 followed by a fuse 262. An inductor 264 follows fuse 262 that is connected to the source of transistor 270. Capacitor 266 is connected from the source of transistor 270 to ground. Diode 268 has its cathode connected to the source of transistor 270 and its anode to ground. The diode clips the negative transient spikes and protects against reversing dc power supply 290 leads. Inductor 264, capacitor 266, and diode 268 comprise a low pass input filter to keep put rf and transient spikes. Transistor 270 is used as a constant current source where the gate is connected to the drain, and further where the drain is fed into the collector of transistor 274. The drain of transistor 272 also feeds the base of transistor 272 and, the collector of transistor 274 which controls the voltage. Zener diode 278 connected from the base of transistor 274 to ground and is used for reference voltage. The collector of transistor 274 is connected to the base of transistor 272. High frequency bypass capacitor 276 is connected from ground to the gate and drain of transistor 270, the collector of transistor 274, and the base of transistor 272. Feedback capacitor 280 is connected from the emitter of transistor 272 to the base of transistor 274. Resistor 282, potentiometer 284, and resistor 286 are connected from the emitter of transistor 272 to ground in a series arrangement. Wiper arm 285 of potentiometer 284 is connected to the base of transistor 274. A power supply filter capacitor 288 is connected from the emitter of transistor 272 to ground providing filtering and defining the output of power supply 20.

MODE OF OPERATION OF INVENTION

Figure 2:
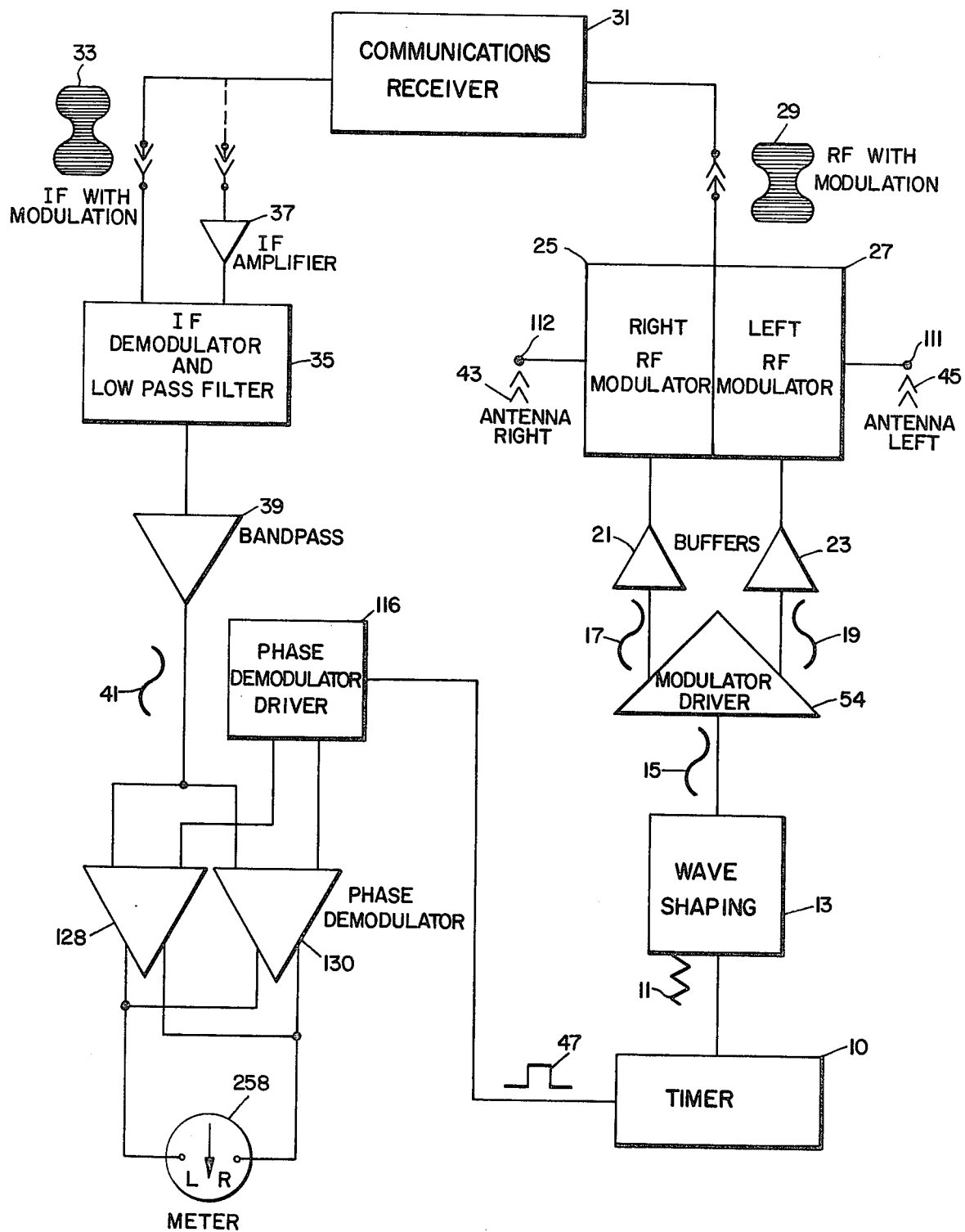
FIG. 2 is a block diagram of the invention.

Operation of the circuit diagram of FIG. 1 is readily explained through the block diagram of FIG. 2. Timing oscillator 10 generates a square waveform 47 and a triangular waveform ninety degrees out of phase. The triangular waveform 11 appears as a charge and discharge across timing oscillator capacitor 12 (FIG.1). The triangular waveform 11 is transformed to a sine waveform 15 by the wave shaping 13 and filtering capacitor 36 (FIG. 1). The wave shaping 13 is performed by signal clipping diodes 32 and 34 (FIG.1). The filtered sine waveform 15 is fed to modulator driver 54 which takes sine waveform 15 and converts it into two equal and opposite sine waves at a compatible dc level for rf modulators 25 and 27. Right rf modulator 25 and left rf modulator 27 comprises rf modulator 69. Sine waveform 17 is 180° out of phase with sine waveform 19. The resultant two outputs of modulator driver 54 are sine waveforms, low frequency signals sine waveform modulating a dc level of about 5 volts. Two buffer stages, 21 and 23, protect modulator driver 54 from any loading from rf modulators 25 and 27. The rf modulators 25 and 27 comprise PIN diodes 90, 92, 94 and 96, along with other associated circuitry. A right antenna 45 is connected to a right rf antenna input 112 on right rf modulator board 25. A left antenna is connected to a left antenna rf input 114 on the left rf modulator board 27. The rf modulators 25 and 27 take the received rf input cardioid signals from antennas 43 and 45, modulates the rf signals with low frequency sine waveform signals and then combine the output so that the rf output signal 29 is modulated which is then fed to communications receiver 31. From communications receiver 31 an intermediate frequency signal 33 with low frequency modulation is fed to the IF demodulator and low pass filter 35 or if the IF signal with low frequency modulation is a small signal, it is first fed to IF amplifier 37 prior to being fed to the IF demodulator and low pass filter 35. A bandpass filter stage 39 is used as a gain stage for the low frequency demodulated signal, and also as a low and high pass filter. The bandpass filter yields a low frequency demodulated signal 41. The low frequency demodulated signal 41 is fed to phase demodulators 128 and 130 which are alternately turned off and on by phase demodulator driver 118, a hex inverter, which is driven by the square waveform output 47 of timing oscillator 10. The output of the phase demodulator 128 and 130 is filtered and fed to the left-right zero centered sensing meter 258. The deflection of meter 258 is a function of amplitude as well as phase of the 46 hertz signal indicating the direction of the unknown rf signal transmission source. A rf input transmission cardioid signal from an unknown signal source is modulately directly with a sine waveform in that the carrier is always present, and extract directional information from the demodulated sine waveform caused by the carrier.

In actual use of operation, the mobile directional comparator 9 used in combination with a communications receiver forms a direction finding system which processes received signal information from a two port antenna system and compares the signal antenna patterns from antennas 43 and 45 to drive a directional indicator such as a zero centered meter movement 258. Antennas 43 and 45 comprising a suitable two port antenna system such that each will have a cardioid pattern of reception in opposing directions. All coaxial cable is of nominal impendance, and the two cables from both antenna ports 43 and 45 to left and right rf input 111 and 112 respectively are equal lengths. The rf signal output port 110 from mobile directional comparator 9 is connected to the rf input port of communications receiver 9. The rf output 33 of communications receiver 31 is fed into mobile differential combiner 9. A connection to a suitable dc power supply source 290 is also required.

In antennas 43 and 45 are mounted on an automobile for and by way of example so that the center of axis of antennas 43 and 45 coincide with the center axis of the automobile, then a right indication on meter 258 indicates that the unknown rf signal transmission source is to right front or right rear of the automobile. One turn of the automobile is all that is necessary to resolve any directional ambiguity as to the right front or right rear if such exists. The vehicle rotates the direction finding system comprising the mobile directional comparator 9, in combination with communications receiver 31. Further, more than one pair of antennas can be connected to mobile directional comparator 9 through the utilization of coaxial relays to switch back and forth to different pairs of antennas. A dual pair set of right/left antennas and fore/aft antennas could be mounted on a vehicle to provide four quadrant information to direction find the unknown rf signal transmission source. Any two port or suitable dual antenna system capable of producing crossover patterns can be utilized with the system. The rf antenna input ports 111 and 112 accept frequencies up to about 1 gighertz provided that a matching two port antenna system 43 and 45 in combination with communications receiver 31 is utilized in the associated frequency spectrum. Mobile directional comparator 9 functions efficiently when the automatic gain control has adequate filtering so that the 46 hertz sine waveform will not be fed back into communications receiver 31. The rf balance control 65 is utilized as not only a balance for left and right modulator 25 and 27 respectively but it is used to a limited degree for total system balance. The IF gain control 178 adjust the scale deflection for a normal operating signal with clipping or saturation of the rf signal 33.

Various modifications are comtemplated and may obviously be resorted to by those skilled in the art without departing from the spirit and scope of the invention; as hereinafter defined by the appended claims, as only a preferred embodiment thereof has been disclosed. Overall efficiency of mobile directional comparator 9 is directly proportional to the efficiency of PIN diodes 90, 92, 94, and 96 in that the overall efficiency drops with the efficiency of the diodes. The high frequency range of mobile directional comparator 9 is limited by the ferrite core of coil 99 of hybrid 98 and impedance ratio matching transformer 108. Timing oscillator 10 may generate any suitable basic frequency signal for rf modulator 69 comprising right rf modulator 25 and left rf modulator 27 and the IF demodulator circuitry 35 in lieu of the 46 hertz signal. Any suitable integrated circuit may be substituted for those specifically disclosed in the detailed description of the invention.

What is claimed and desired to be secured by Letters Patents of the United States is:

1. A mobile comparator used in a direction finding system comprising; timing means, wave shaping means driven by said timing means, modulator driver means having two signal outputs driven by said wave shaping means, modulation means to modulate two received cardioid antenna signal patterns from left and right antennas, means to combine said signals patterns, means to feed said combined signal into a receiving system, means to demodulate an intermediate frequency signal from said receiving system means for phase detecting the said demodulated intermediate frequency with respect to the original modulation, and directional indication means driven by the said phase detector.

2. The mobile directional comparator of claim 1 further comprising low pass filter means through which said demodulated intermediate frequency signal from said receiving system passes, bandpass filter means through which said demodulated intermediate frequency signal passes, phase demodulating driver means, driven by said timing means, phase demodulating means driven by said phase demodulating driver means, directional indicator means driven by said phase demodulating means, and power supply means supplying circuitry power.

3. The mobile directional comparator of claim 1 wherein said combining means comprises a hybrid combiner consisting of a coil and two loading resistors forming a delta network.

4. The mobile directional comparator of claim 1 wherein said phase demodulation means comprises a dual differential Darlington pair cross connected which extracts phase and amplitude of said intermediate frequency signal to drive said directional indication means.

5. The mobile directional comparator of claim 1 wherein said direction indication means comprises a zero centered meter movement providing left and right movement from said zero center.

6. The mobile directional comparator of claim 1 wherein said timing means comprises a timing oscillator.

7. The mobile directional comparator of claim 1 wherein said wave shaping means comprises two parallel reverse diodes and a low pass filter.

8. The mobile directional comparator of claim 1 wherein said modulator driver means comprises a dual differential Darlington with parallel amplifiers which invert two left and right signal outputs.

9. The mobile directional comparator of claim 1 wherein said filter means comprises a low impedance, three stage, low pass filter.

10. The mobile directional comparator of claim 2 wherein said bandpass filter means comprises a transistor in a grounded emitter configuration which also provides gain and matching from said filter means to said phase demodulating means.

11. The mobile directional comparator of claim 2 wherein said phase demodulating driver means comprises an open collector hex inverter which alternatively turn on and off said phase demodulating means.

* * * * *